No. 798,189. PATENTED AUG. 29, 1905.
A. KOPPEL.
TRAIN OF WAGONS.
APPLICATION FILED JAN. 18, 1905.

Witnesses
H. M. Kuhn.
John G. Percival.

Inventor
Arthur Koppel
By Richards
Attorneys

UNITED STATES PATENT OFFICE.

ARTHUR KOPPEL, OF BERLIN, GERMANY.

TRAIN OF WAGONS.

No. 798,189.  Specification of Letters Patent.  Patented Aug. 29, 1905.

Application filed January 18, 1905. Serial No. 241,641.

*To all whom it may concern:*

Be it known that I, ARTHUR KOPPEL, engineer, of Dorotheenstrasse 45, Berlin, Germany, have invented certain new and useful Improvements in Trains of Wagons, of which the following is a full, clear, and exact specification.

My invention relates to trains of wagons of the type described in the specification of Letters Patent No. 776,405, which comprises a train two-wheeled wagons, the body of each of which is rigidly mounted on its axle so as to form a rotary frame with large wheels, the wagons being connected in pairs to form composite elements by means of connections creating a direct dependence of the positions of the axles and the bodies joined thereto, while supporting members connect trunnions on axles and bodies belonging to one composite element.

The present invention consists in a development of that described in the above-mentioned specification. The connecting member between the trunnions on the axles of each pair of wagons is retained, but a different form of connection for the angular dependence between the two axles and bodies of or frames of each composite element is adopted—namely, the rear wagon or frame of each composite element considered relatively to the direction of travel is rigidly fixed by means of a bolt, pin, or the like to the member connecting the trunnions of each pair. As described in the former specification, each composite element or pair is coupled to the next composite element or pair by ordinary pins or the like.

Figure 1:
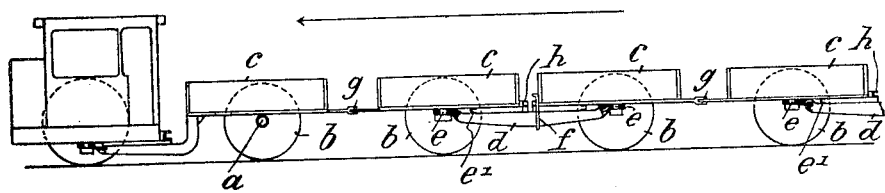
Figure 2:
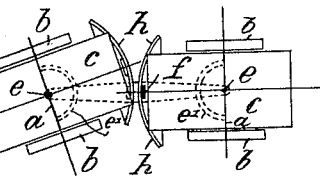
Figure 2:
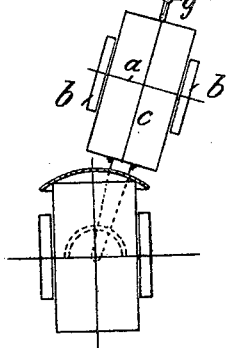

The accompanying drawings illustrate the invention diagrammatically, Figure 1 being an elevation, and Fig. 2 a plan.

In carrying out the invention the axles $a$, provided with large wheels $b$ and the bodies $c$, rigidly mounted on the axles, thereby forming rotary frames, are connected, as before, by members $d$ to form composite elements or pairs. Pins $g$ are used for coupling the composite elements to each other. The member $d$, however, of each composite element is adapted to receive a bolt, pin, or the like $f$, by which one of the wagon bodies or frames of the respective element may be rigidly secured thereto. The rear wagon or frame of each element or pair considered relatively to the direction of travel is the one which is to be rigidly secured to its connecting member. It has been found in practice that this method of coupling practically fulfils all requirements both for turning curves and for returning to the straight line again. The rear wagon need not accurately follow the forward wagon, which acts as a rotary frame, but may turn about a smaller radius. This, however, is equalized by the next coupled composite element, so that a correct track of the total wagons results.

A special advantage obtained by the above method of coupling as compared with other systems is that the train of wagons can be hauled in either direction by withdrawing one set of the bolts $f$ and inserting the other set, so as to lock the respective rear wagons according to the direction of travel. This permits travel over very sharp angles, the motor-wagon or traction-engine being taken from one end and coupled to the other.

The possibility of turning small curves is indicated in the figures by the semicircular turn-tables or guides $e'$ and the projecting breast-plates or supports $h$.

Having thus described my invention, what I claim as new, and desire to secure by Letters Patent, is—

1. The combination with a plurality of vehicles, of members for connecting said vehicles together in pairs and means for connecting one vehicle of each pair rigidly to its connecting member.

2. The combination with a plurality of vehicles, of members for connecting said vehicles together in pairs and removable means for connecting one vehicle of each pair rigidly to its connecting member.

3. The combination with a plurality of vehicles, of members for connecting said vehicles together in pairs and means for connecting the rearmost vehicle of each pair rigidly to its connecting member.

4. A wagon train consisting of large-wheeled rotary frames, each of said frames consisting of one set of wheels, and a loading-body rigidly secured thereto, a supporting longitudinal connecting-piece lying underneath the bodies of two of the frames so as to connect them together and means for rigidly connecting either one of the frames with the connecting-piece, so that the rotary frame placed in front with regard to the draft direction may each time be used for steering, while that placed in the rear may be rigidly connected with the longitudinal piece.

In testimony whereof I have signed my name to this specification in the presence of two subscribing witnesses.

ARTHUR KOPPEL.

Witnesses:
 WOLDEMAR HAUPT,
 HENRY HASPER.